United States Patent
Yano (10) Patent No.: US 8,923,552 B2
(45) Date of Patent: Dec. 30, 2014

(54) OBJECT DETECTION APPARATUS AND OBJECT DETECTION METHOD

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 12/684,030

(22) Filed: Jan. 7, 2010

(65) Prior Publication Data

US 2010/0177932 A1    Jul. 15, 2010

(30) Foreign Application Priority Data

Jan. 9, 2009  (JP) ................................. 2009-003664

(51) Int. Cl.
*G06K 9/00* (2006.01)
*G06K 9/62* (2006.01)
*G06T 7/00* (2006.01)

(52) U.S. Cl.
CPC ............ *G06K 9/6257* (2013.01); *G06T 7/0081* (2013.01); *G06T 2207/20144* (2013.01)
USPC ........................................... 382/103; 382/104

(58) Field of Classification Search
CPC .................. G06T 7/0081; G06T 2207/20144; G06K 9/6257; G01N 2021/6441
USPC ......... 382/100, 103, 104, 115, 118, 193, 173; 345/90, 473, 707, 705, 709; 340/541, 340/542; 707/1; 348/333.01, 333.11, 348/333.12, 222.1, 345, 347
See application file for complete search history.

(56) References Cited

U.S. PATENT DOCUMENTS

| | | | |
|---|---|---|---|
| 5,912,980 A * | 6/1999 | Hunke | 382/103 |
| 6,400,830 B1 * | 6/2002 | Christian et al. | 382/103 |
| 6,819,783 B2 * | 11/2004 | Goldberg et al. | 382/115 |
| 7,035,430 B2 * | 4/2006 | Ito et al. | 382/103 |
| 7,536,035 B2 * | 5/2009 | Kikuchi | 382/107 |
| 7,940,956 B2 * | 5/2011 | Kinoshita et al. | 382/103 |

(Continued)

FOREIGN PATENT DOCUMENTS

| | | |
|---|---|---|
| JP | 5-284501 A | 10/1993 |
| JP | 07-093558 A | 4/1995 |
| JP | 2007-243660 A | 9/2007 |

OTHER PUBLICATIONS

English translation for Japan Patent Publication JP5284501, Oct. 29, 1993, Kato Hisanobu, application No. 04-083917 filed Apr. 6, 1992, applicant Mitsubishi Corp.*

(Continued)

*Primary Examiner* — Hadi Akhavannik
*Assistant Examiner* — Mehdi Rashidian
(74) *Attorney, Agent, or Firm* — Canon USA Inc IP Division (57) ABSTRACT

An object detection apparatus includes an image acquisition unit that acquires image data, a reading unit that reads the acquired image data in a predetermined image area at predetermined resolution, an object area detection unit that detects an object area from first image data read by the reading unit, an object discrimination unit that discriminates a predetermined object from the object area detected by the object area detection unit, and a determination unit that determines an image area and resolution used to read second image data which is captured later than the first image data from the object area detected by the object area detection unit, wherein the reading unit reads the second image data from the image area at the resolution determined by the determination unit.

7 Claims, 8 Drawing Sheets

(56) References Cited

U.S. PATENT DOCUMENTS

| | | | |
|---|---|---|---|
| 2003/0235327 A1* | 12/2003 | Srinivasa | 382/104 |
| 2004/0062442 A1* | 4/2004 | Laumeyer et al. | 382/190 |
| 2006/0120619 A1* | 6/2006 | Avidan et al. | 382/276 |
| 2006/0215880 A1* | 9/2006 | Berthilsson et al. | 382/103 |
| 2008/0013791 A1* | 1/2008 | Kikuchi | 382/107 |
| 2009/0245573 A1* | 10/2009 | Saptharishi et al. | 382/103 |
| 2010/0060727 A1* | 3/2010 | Steinberg et al. | 348/77 |

OTHER PUBLICATIONS

English translation of Japan Patent Publication JP5284501, Oct. 29, 1993, Kato Hisanobu, application No. 04-083917 filed Apr. 6, 1992, applicant Mitsubishi Corp.*

JungHwan Oh, Kien A. Hua, Ning Liang, "A Content-Based Scene Change Detection and Classification Technique Using Background Tracking", University of Central Florida, published by IS&T/SPIE Conference on Multimedia Computing and Networking, Jan. 2000, SPIE vol. 3969 pp. 354-265.*

* cited by examiner

OBJECT DETECTION APPARATUS AND OBJECT DETECTION METHOD

BACKGROUND OF THE INVENTION

1. Field of the Invention

The present invention relates to an object detection apparatus and an object detection method, in particular, to a technique for detecting an object in an image captured by a camera or the like.

2. Description of the Related Art

Recently, installation of monitoring cameras for security reasons has been rapidly spreading. An apparatus which automatically detects an intrusion of a suspicious person or object by using such monitoring cameras is known. For example, Japanese Patent Application Laid-Open No. 5-284501 discusses an intrusion monitoring imaging apparatus which extracts feature data, such as an area, a moving direction and moving speed, of an object which is captured in a monitoring area of the apparatus and compares the extracted feature data with preliminary stored feature data of intruders. When these feature data match with each other, the apparatus identifies the object as an intruder and raises an alarm. Further, the apparatus captures the object in the monitoring area by using a difference between a processing image and a background.

In addition, there is a demand for the above described monitoring in a broad area in detail. In this case, a plurality of monitoring cameras may be used to monitor a broad area in detail. However, installation of the plurality of monitoring cameras creates a problem of high cost and detection results obtained by the plurality of monitoring cameras must be managed in a collective manner. In order to solve these problems, a monitoring camera which includes a high resolution image sensor and a wide field imaging lens may be used. However, an amount of data to be processed in this method may become enormous, so that the object cannot be detected within a predetermined time.

SUMMARY OF THE INVENTION

The present invention is directed to detecting an object in a wide field in detail.

According to an aspect of the present invention, an object detection apparatus includes an image acquisition unit configured to acquire image data, a reading unit configured to read image data, acquired by the image acquisition unit, in a predetermined image area at predetermined resolution, an object area detection unit configured to detect an object area from first image data read by the reading unit, an object discrimination unit configured to discriminate a predetermined object from the object area detected by the object area detection unit, and a determination unit configured to determine an image area and resolution used to read second image data which is captured later than the first image data from the object area detected by the object area detection unit, wherein the reading unit reads the second image data from the image area at the resolution determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
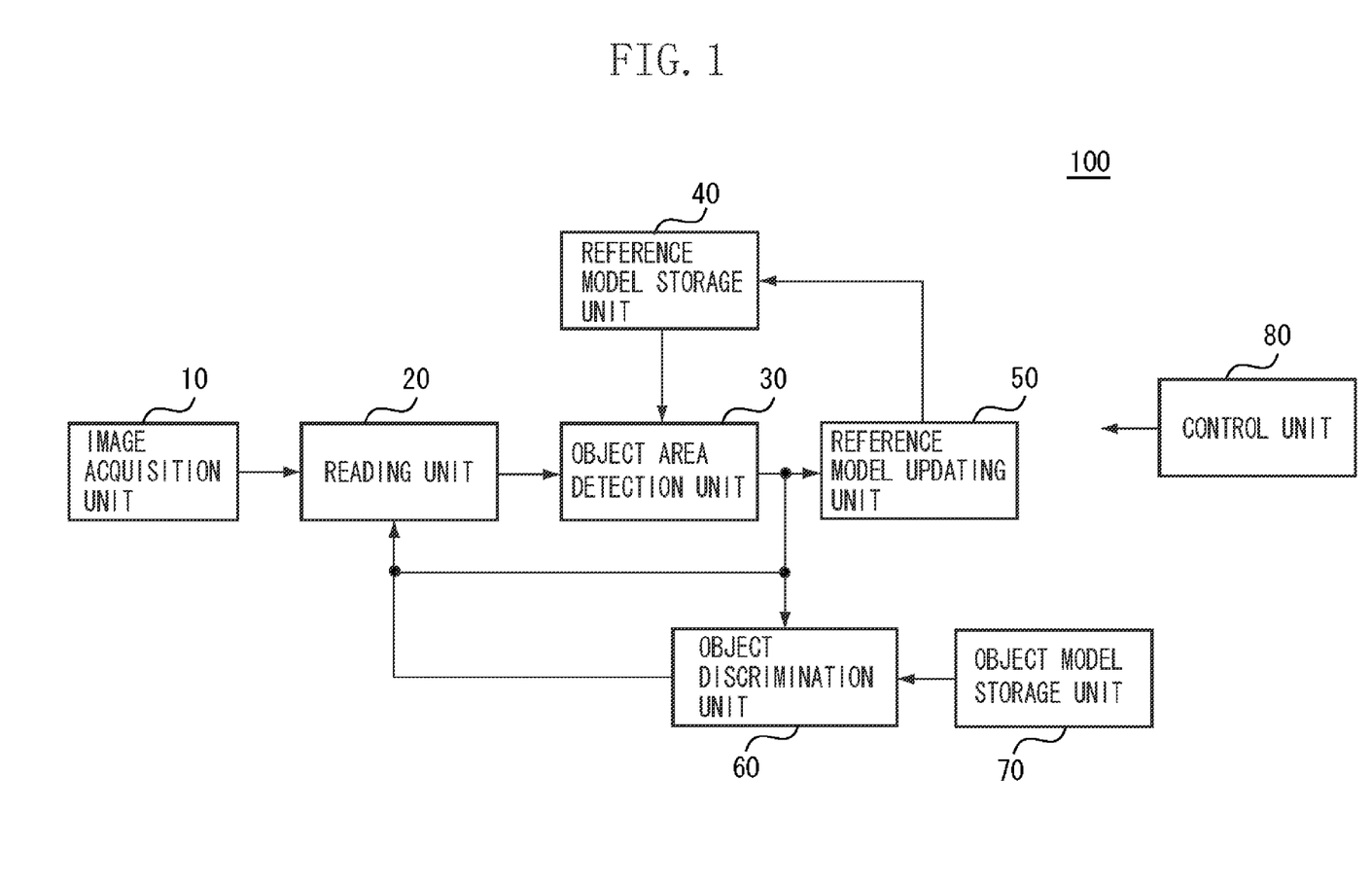
FIG. 1 is a block diagram illustrating an example of a function configuration of an object detection apparatus according to a first exemplary embodiment.

FIG. 1 is a block diagram illustrating an example of a function configuration of an object detection apparatus 100 according to a first exemplary embodiment.

In FIG. 1, an image acquisition unit 10 includes an imaging lens and an image sensor which generates a pixel signal by performing photoelectric conversion. The present exemplary embodiment uses a complementary metal oxide semiconductor (CMOS) image sensor which can control reading per pixel as the image sensor, but any type of image sensor that would enable practice of the present invention is applicable.

A reading unit 20 reads the pixel signal generated by the image acquisition unit 10. The reading unit 20 can read a pixel signal with arbitrary resolution and in an arbitrary area by controlling the pixel signal read from an image capturing area of the image acquisition unit 10 per pixel. Further, the reading unit 20 generates image data from a plurality of the read pixel signals and outputs the image data in frame unit at a predetermined time interval.

An object area detection unit 30 compares the image data output from the reading unit 20 with a reference model stored in a reference model storage unit 40 and detects and output an area in which an object is captured in the image data. The reference model storage unit 40 stores a background model that is formed by image data including only background which is obtained from the image acquisition unit 10 and the reading unit 20 as a reference model.

A reference model updating unit 50 updates information about the object area which is a detection result by the object area detection unit 30 and updates the reference model stored in the reference model storage unit 40 based on the image data generated by the reading unit 20.

An object discrimination unit 60 identifies whether a target object is included in the image data output from the reading unit 20 using an object dictionary stored in an object model storage unit 70. The object model storage unit 70 is a memory that stores the object dictionary which is used in the object discrimination unit 60 to identify the target object. The object dictionary is prepared in advance from many object patterns by a machine learning method. Operations of the above described units are controlled by a control unit 80.

Figure 2:
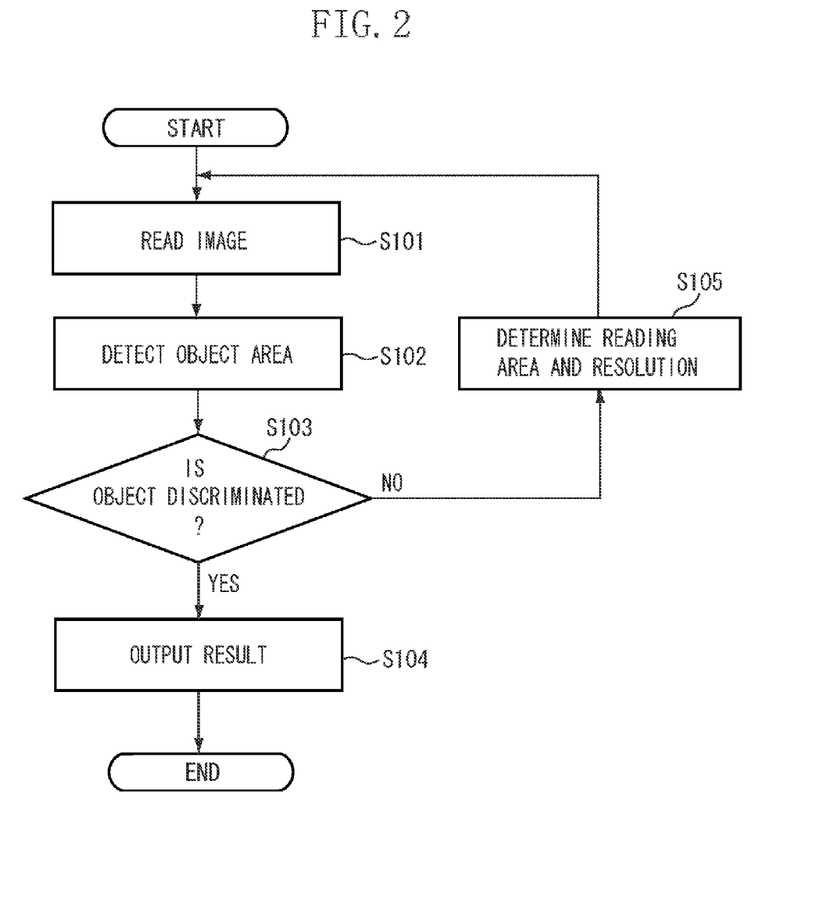
FIG. 2 is a flowchart illustrating an example of a processing procedure of object detection according to the first exemplary embodiment.

FIG. 2 is the flowchart illustrating an example of a processing procedure of object detection according to the present exemplary embodiment.

In step S101, the reading unit 20 reads a pixel signal from the image capturing area of the image acquisition unit 10 per pixel and generates image data. At this time, the reading unit 20 can read the pixel signal as image data with arbitrary resolution and in an arbitrary area by controlling the read pixel signal per pixel. The image data read in this step is, for example, two-dimensional array luminance data configured by 8 bit pixels.

In an initial operation of the object detection, the reading unit 20 is controlled to read a pixel signal at every n pixels in an entire image capturing area of the image acquisition unit 10. A value "n" is calculated by the following expression (1):

$$n = SQRT(N/M) \quad (1)$$

where, n represents reading resolution, N represents a number of pixels which can be read within a predetermined time period (e.g. one thirtieth second), M represents a total number of pixels of the image sensor of the image acquisition unit 10, "SQRT ( )" represents a square-root operation. The value "n" is a minimum integer value which is larger than a right-hand side value of the expression (1).

When an image is read from a part of the image capturing area of the image acquisition unit 10, the reading resolution "n" is determined by the following expression (2):

$$n = SQRT(N/L) \quad (2)$$

where L represents a number of pixels of the image sensor in a predetermined area of the image acquisition unit 10.

Then in step S102, the object area detection unit 30 compares the image data output from the reading unit 20 with the reference model stored in the reference model storage unit 40 and detects an area which includes an object from the image data. The operation in step S102 is described in detail below with reference to FIG. 3 and FIG. 4.

Figure 3:
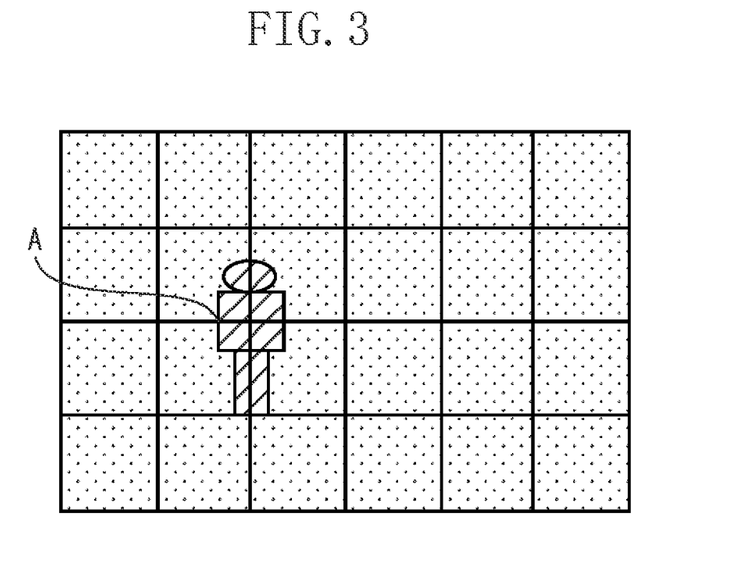
FIG. 3 illustrates an example of an image of a person captured by an image acquisition unit according to the first exemplary embodiment.
Figure 4:
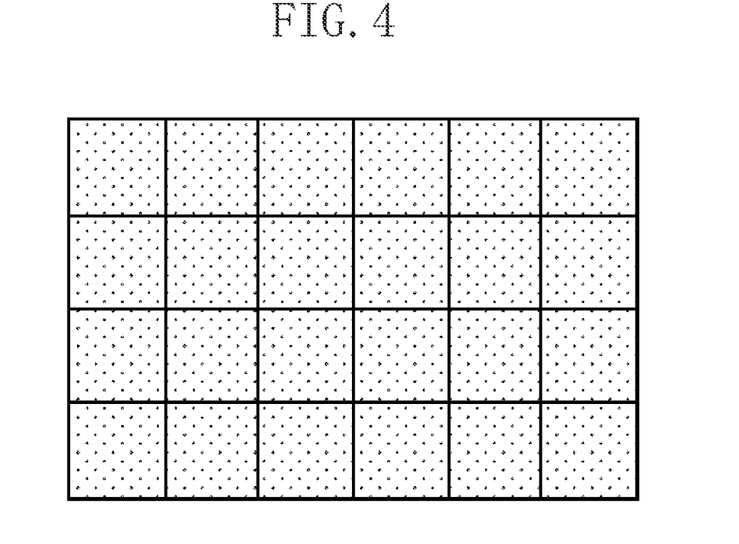
FIG. 4 illustrates an example of a background image which is a base of a background model stored in a reference model storage unit according to the first exemplary embodiment.

FIG. 3 illustrates an example of an image when a person A is captured by the image acquisition unit 10 according to the present exemplary embodiment. FIG. 4 illustrates an example of a background image which is a base of the background model stored in the reference model storage unit 40 according to the present exemplary embodiment. The background image is obtained in advance by the image acquisition unit 10 and the reading unit 20 with no object captured in the image.

An actual background model is formed by dividing a background image as illustrated in FIG. 4 into predetermined blocks and storing an image feature quantity thereof per block. For example, the image is divided into 8*8 pixel blocks and a part of a discrete cosine transform (DCT) coefficient is regarded as the image feature quantity. The DCT coefficient is an output value of DCT processing using the image data in the blocks.

The object area detection unit 30 acquires an image feature quantity of the image data illustrated in FIG. 3 per block using the similar method, and calculates a distance D from the image feature quantity of the block corresponding to the background model by the following expression (3):

$$D = a \cdot |X - Xb| \quad (3)$$

where each of X and Xb represents a feature vector configured by the image feature quantity in each block, "a" represents a predetermined determination vector for determining the object area, "·" represents an inner product of vectors, and "| |" represents an absolute-value operation.

Figure 5:
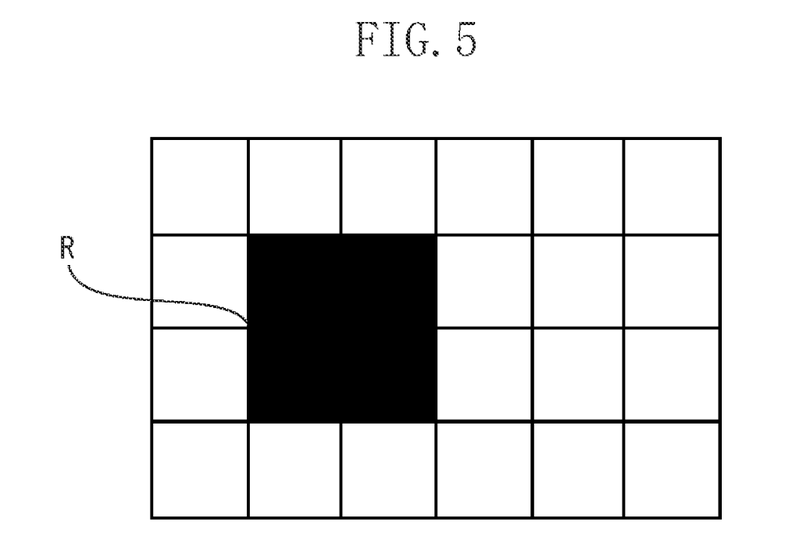
FIG. 5 illustrates a result which is obtained from the images in FIG. 3 and FIG. 4.

Then a binary image is output in which a value 1 is assigned to a block whose distance D calculated by the expression (3) is a predetermined value or larger and a value zero is assigned to a block other than that. FIG. 5 illustrates a result which is obtained from the images in FIG. 3 and FIG. 4. In FIG. 5, black portions are assigned the value 1 and white portions are assigned zero. In other words, the black portions represent blocks in which the object exists and the white portions represent blocks of the background without the object.

In the initial operation of the object detection, an image obtained by the reading unit 20 is an image which is obtained by reading every n pixels in the entire image capturing area of the image acquisition unit 10, so that the image is a relatively low resolution image. When comparison with the reference model is performed, the object area detection unit 30 uses the background image with the same resolution as of the image obtained by the reading unit 20. More specifically, in this case, the object area detection unit 30 uses the background model corresponding to the image obtained from every n pixels. The reference model storage unit 40 stores the background model corresponding to the background images of a plurality of kind of resolution which are obtained in advance by the image acquisition unit 10 and the reading unit 20 with no object captured in the image.

The reference model updating unit 50 updates the image feature quantity of the background model stored in the reference model storage unit 40 using the block which is determined that no object is captured therein based on the detection result by the object area detection unit 30. Update processing is performed by, for example, calculating a weighted average of the image feature quantity of the image data generated by the reading unit 20 and the image feature quantity of the background model with the same resolution as of the read image already stored in the reference model storage unit 40.

Next in step S103, the object discrimination unit 60 determines whether the target object is discriminated by checking the image data output from the reading unit 20 using the object dictionary stored in the object model storage unit 70. At this time, discrimination processing is performed by narrowing down a search to the object area detected by the object area detection unit 30.

In the present exemplary embodiment, a person's face is assumed as an object to be discriminated. An object discrimination method may include methods discussed in the following references, such as, "Neural network-based face detection", Rowley et al, IEEE TRANSACTIONS ON PATTERN ANALYSIS AND MACHINE INTELLIGENCE, VOL. 20, NO. 1, Jan. 1998, and "Rapid Object Detection using Boosted Cascade of Simple Features", Viola and Jones, Proceedings of the IEEE Conference on Computer Vision and Pattern Recognition (CVPR'01).

In the "Neural network-based face detection" reference, a face pattern in an image is detected by a neural network. According to this method, first, image data which is subjected to detection of a face is read from a memory and a predetermined area to be checked with the face is extracted from the read image data. Then, calculation is performed by the neural network using distribution of pixel values in the extracted area to obtain a calculation result. At this time, a weight of the neural network and a threshold value are learned in advance from an enormous amount of face image patterns and non-face image patterns.

Figure 6:
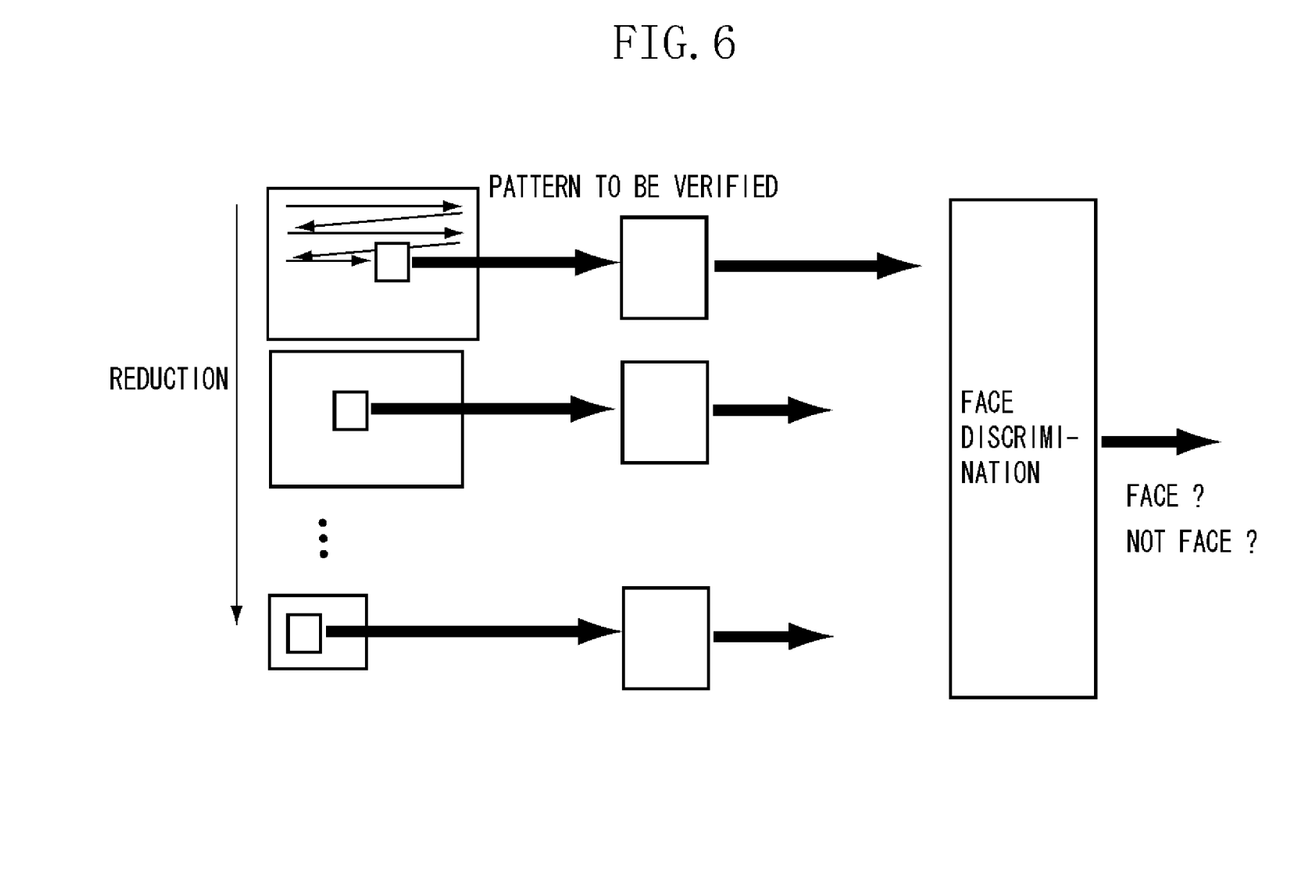
FIG. 6 illustrates a method for searching an image for a face pattern.

For example, when a calculation result by the neural network is greater than or equal to zero, the image is determined as a face and the calculation result other than zero is determined as a non-face image. A position to extract an image pattern to be checked with the face is sequentially scanned, for example, in every direction in an entire area of the image to detect the face from the image. In order to handle detection of faces of various sizes, as illustrated in FIG. 6, the image is sequentially reduced at a predetermined ratio, and the above-described scanning for face detection is performed on each reduced image.

On the other hand, a method discussed in the "Rapid Object Detection using Boosted Cascade of Simple Features" reference focuses on increasing processing speed. In this method, face detection accuracy is improved by combining many weak discriminators using the AdaBoost algorithm. Each of the weak discriminators is configured by a Haar type rectangular feature quantity. Further the rectangular feature quantity is calculated at a high speed by utilizing an integrated image. Further, the discriminators which are obtained by learning of the AdaBoost algorithm are serially connected to configure a cascade face detector.

The cascade face detector uses a discriminator which performs a few amount of simple calculations in a foregoing part and immediately deletes a candidate which is obviously not a face pattern. Then in a latter part, only the other candidates are determined whether to include the face by using a discriminator which has a higher discrimination performance and performs a large amount of complex calculation. As described above, since it is not necessary to perform complex determination on all candidates, the determination can be performed in a high speed.

Figure 7:
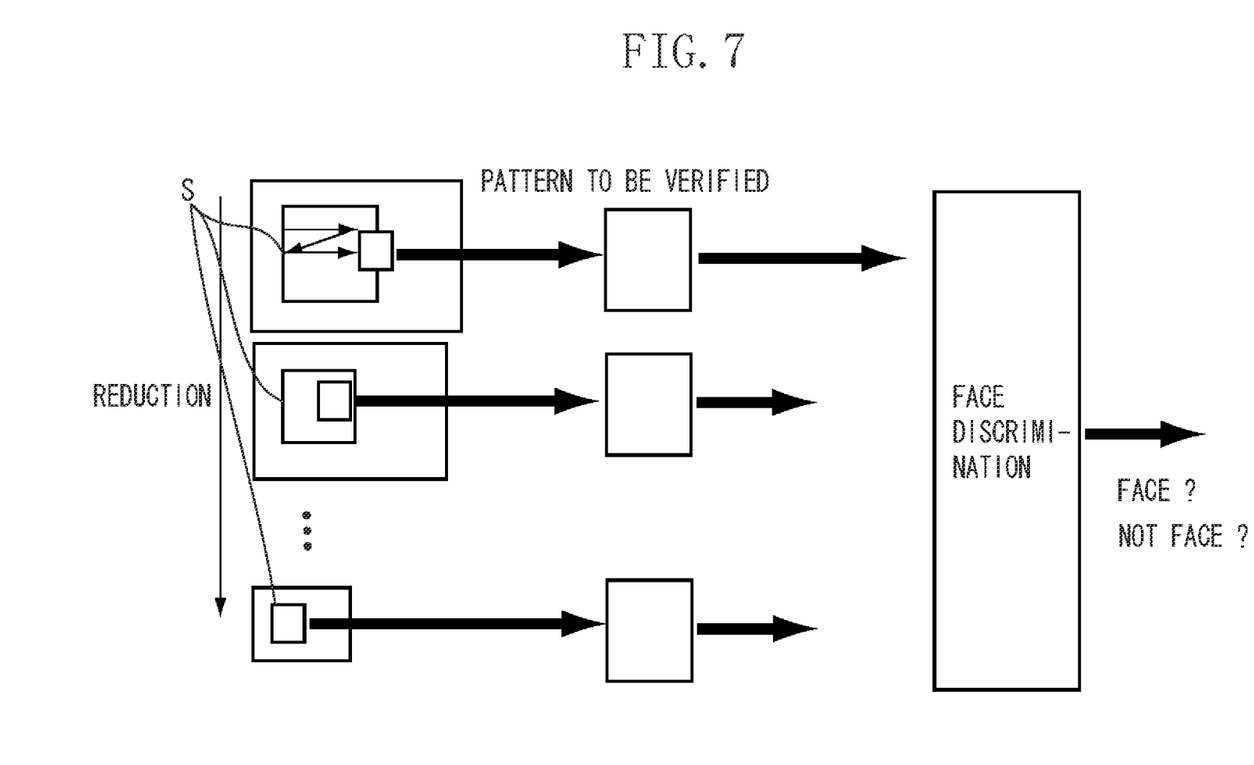
FIG. 7 illustrates a method for refining a search for a face pattern in an image according to a searching result of an object area.

FIG. 7 illustrates a state in which the discrimination is performed by narrowing down to the object area detected by the object area detection unit 30 as described above. Extraction of an image area to be checked is performed in areas "S" in FIG. 7. The above described references discuss a technique for detecting a face from an image, and such technique can be applied to detection of other objects in an image.

In step S103, if the target object is discriminated (YES in step S103), then in step S104, the object discrimination unit 60 detects position coordinates of the object area and outputs a detection result. At this time, the control unit 80 stores a result of the object detection in a storage device (not illustrated) and displays the result on a display device (not illustrated), then terminates the processing.

On the other hand, if the target object is not discriminated (NO in step S103), then in step S105, the reading unit 20 determines a reading area and resolution of detection processing in a next frame from the detection result of the object area detection unit 30. For example, as illustrated in FIG. 5, a rectangular area "R" which surrounds the black portions is determined from the binary image output by the object area detection unit 30. Then a number of pixels in the rectangular area are acquired, and the reading resolution n is calculated using the above described expression (2) by setting the acquired pixels to "L". Then the processing returns to step S101, and the processing from step S101 to step S105 is repeated.

For example, when a detection result as illustrated in FIG. 5 is obtained, in step S101 of the next routine, reading processing is limited to the rectangular area "R", so that the resolution in the processing becomes higher than initial resolution of the entire image. When the target object is not discriminated, the processing from step S101 to step S105 is further repeated while the resolution is gradually increased. Therefore, an intrusion of a person or an object can be detected in detail.

If no area is detected as the object area in step S102, the initial operation is continued and the reading unit 20 is controlled to read the image signal from the entire image capturing area of the image acquisition unit 10. Even if a case where the target object is discriminated in step S103 and a discrimination result is output in step S104, the object detection may be continued by repeating the processing from step S101 to step S105.

As described above, in the present exemplary embodiment, an area from which an image is read and resolution thereof is determined based on a detected object area. Further, the resolution is increased by repeating the processing and narrowing down the reading area, and a target object is discriminated by narrowing down to the detected object area. Therefore, an intrusion of a person or an object can be detected within a practical time period by a monitoring camera provided with a high resolution image sensor.

Next, a configuration and processing procedure of a second exemplary embodiment are described with reference to FIG. 8 and FIG. 9. In the present exemplary embodiment, an entire image capturing area is read at low resolution to detect an object area, where the area is narrowed down according to detection results. Further, the object discrimination is performed after an image is read at resolution sufficient to discriminate an object.

Figure 8:
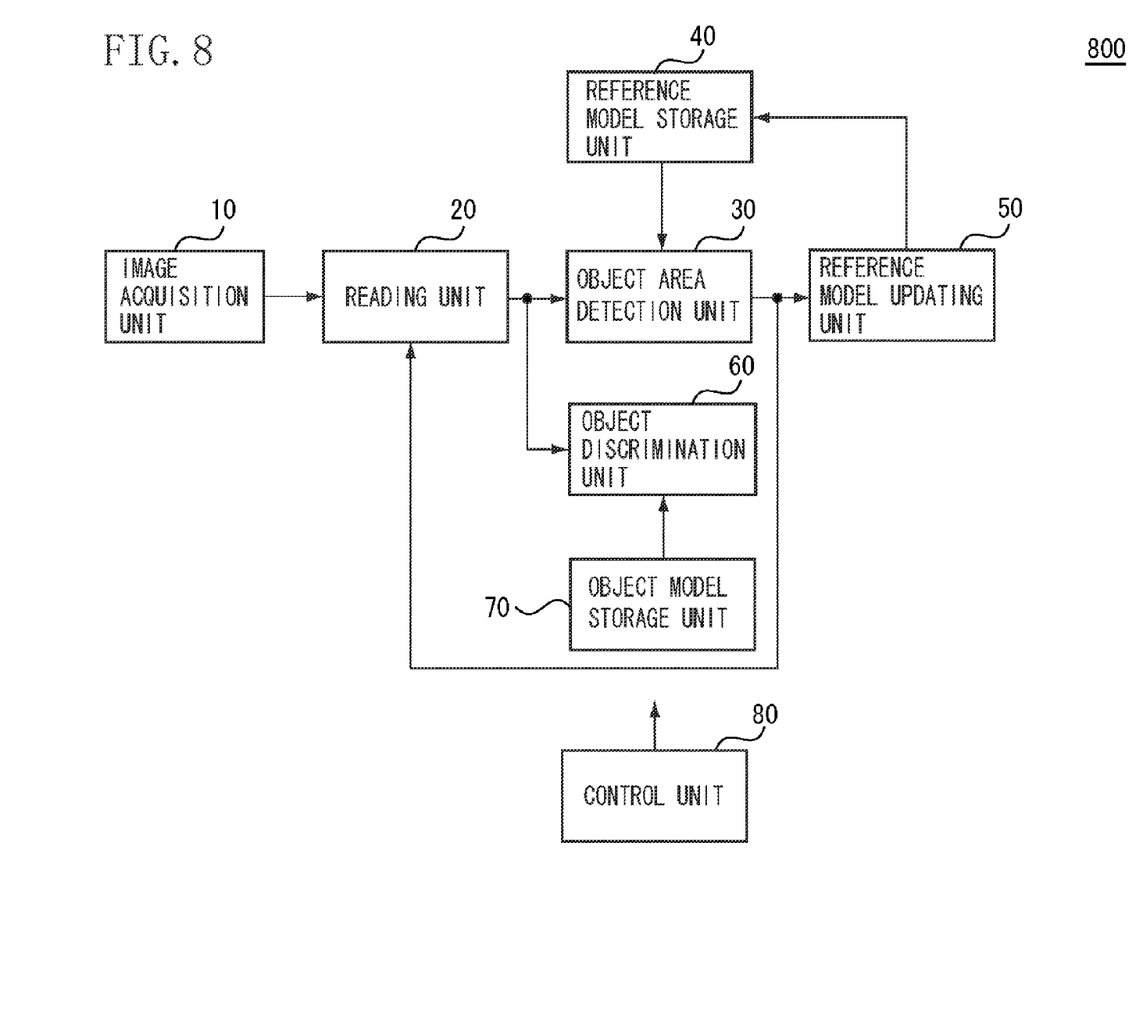
FIG. 8 is a block diagram illustrating an example of a function configuration of an object detection apparatus according to a second exemplary embodiment.

FIG. 8 is a block diagram illustrating an example of a function configuration of an object detection apparatus 800 according to the present exemplary embodiment. In FIG. 8, the same reference numeral is assigned to a component which is similar to that in FIG. 1. Therefore, description of the components similar to those in the first exemplary embodiment will not be repeated.

Figure 9:
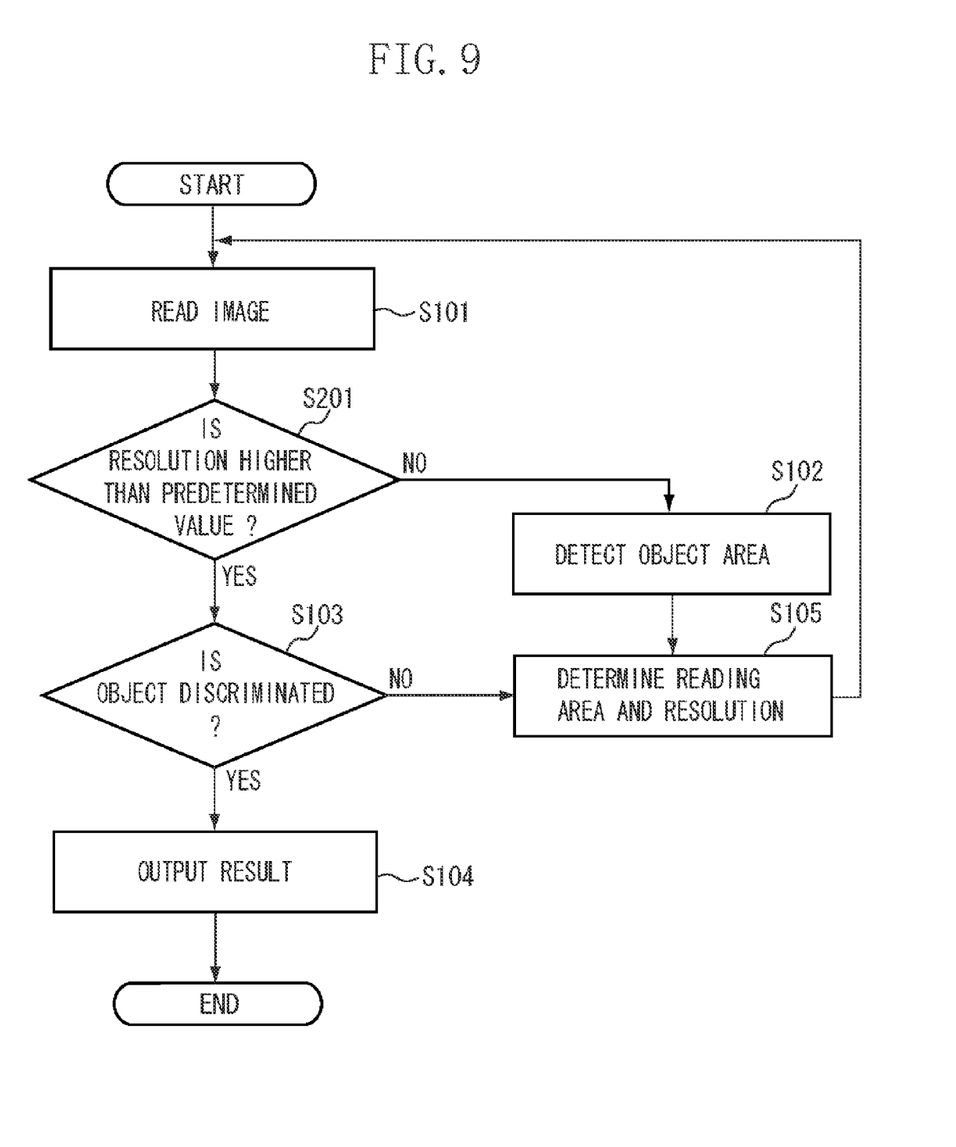
FIG. 9 is a flowchart illustrating an example of a processing procedure of object detection according to the second exemplary embodiment.

FIG. 9 is a flowchart illustrating an example of a processing procedure of object detection according to the present exemplary embodiment. The operation in the present exemplary embodiment is different from that of the first exemplary embodiment at a point that step S201 for determining processing contents is added.

Instep S101, the reading unit 20 reads a pixel signal from the image capturing area of the image acquisition unit 10 per pixel and generates image data. Then in step S201, the control unit 80 determines the processing contents based on the reading resolution set by the reading unit 20. Thus, resolution of an image read by the reading unit 20 is determined to determine the processing contents.

Accordingly, if it is determined that the reading unit 20 reads the image with the resolution higher than predetermined resolution (YES in step S201), the object detection can be performed in detail, so that the processing proceeds to step S103 for performing the object discrimination. On the other hand, if the reading unit 20 reads the image with the resolution lower than the predetermined resolution (NO in step S201), it is necessary to narrow down a detection area, thus the processing proceeds to step S102 for performing object area detection. In an initial operation, since the pixel signal is read from the entire image capturing area at the low resolution, the processing proceeds to step S102 for processing the object area detection.

In step S102, the object area detection unit 30 compares the image data generated by the reading unit 20 with the reference model stored in the reference model storage unit 40 and detects an area which includes an object from the image data.

Then in step S105, the reading unit 20 determines a reading area and resolution of detection processing in a next frame from the detection result of the object area detection unit 30.

The processing returns to step S101 and is repeated. At this time, the processing is performed while the resolution is gradually increased by narrowing down a search to the object area detected by the object area detection unit 30. Consequently, when the reading unit 20 reads the image with the resolution higher than the predetermined resolution in step S101, the processing proceeds from step S201 to step S103 to perform the object discrimination.

Next in step S103, the object discrimination unit 60 determines whether the target object is discriminated by checking the image data generated by the reading unit 20 using the object dictionary stored in the object model storage unit 70. At this time, the object discrimination unit 60 performs the discrimination processing on the area read by the reading unit 20 at the resolution in step S101.

Accordingly, if the target object is discriminated (YES in step S103), the processing proceeds to step S104. In step S104, the object discrimination unit 60 detects the position coordinates of the object area and outputs a detection result. At this time, the control unit 80 stores a result of the object detection in a storage device (not illustrated) and displays the result on a display device (not illustrated), then terminates the processing. On the other hand, if the target object is not discriminated (NO in step S103), then the processing proceeds to step S105, The reading area and the resolution are set to be similar to those in the initial operation in which the entire image capturing area is read.

As described above, in the present exemplary embodiment, a detection area is gradually narrowed down based on a detection result of an object area, and object discrimination is performed after an image can be read at predetermined resolution. Therefore, an intrusion of a person or an object can be detected within a practical time period by a monitoring camera provided with a high resolution image sensor.

In the above described exemplary embodiments, a case maybe assumed in which the object moves while detection of the object area is repeated every frame and the object is out of the detection area in the frame which is subjected to the object discrimination. In order to deal with such a case, an area which is subjected to the object discrimination may be predicted from detection results at a plurality of continuous time periods by the object area detection unit 30, and the object discrimination may be performed on the predicted object area. For example, a barycentric position and a range of the object area in the next frame may be predicted from the barycentric position and the range of the object area which is detected in the past frame by using a Kalman filter.

In the above described exemplary embodiments, a method for automatically detecting an intrusion of a person or an object in a broad area in detail using a monitoring camera provided with a high resolution image sensor is described. However, the scope of the present invention is not limited to these embodiments.

Aspects of the present invention can also be realized by a computer of a system or apparatus (or devices such as a CPU or MPU) that reads out and executes a program recorded on a computer-readable storage medium to perform the functions of the above-described embodiments, and by a method, the steps of which are performed by a computer of a system or apparatus by, for example, reading out and executing a program recorded on a computer-readable storage medium to perform the functions of the above-described embodiments. For this purpose, the program is provided to the computer from the computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-003664, filed Jan. 9, 2009, which is hereby incorporated by reference herein in its entirety.

What is claimed is:

1. An apparatus for object detection, the apparatus comprising:
    an image acquisition unit configured to acquire image data;
    a reading unit configured to read image data, of a first frame in sequential frames, acquired by the image acquisition unit, in a predetermined image area with a predetermined resolution;
    an object area detection unit configured to detect an object area from first image data read by the reading unit;
    an object discrimination unit configured to discriminate a predetermined object from the object area detected by the object area detection unit;
    an area determination unit configured to determine an image area to read image data of a second frame succeeding to the first frame in the sequential frames based on the object area in the first frame; and
    a resolution determination unit configured to determine a resolution used to read the image data from the image area of the second frame determined by the area determination unit based on a first number of pixels in the object area of the first frame and a second number of pixels which can be read within a predetermined time period by the reading unit,
    wherein the reading unit reads the image data from the image area of the second frame determined by the area determination unit at the resolution determined by the determination unit.

2. The apparatus according to claim 1 further comprising:
    a reference model storage unit configured to store a reference model with multiple resolutions which is compared with the image data read by the reading unit,
    wherein the object area detection unit detects the object area of the image data read by the reading unit by sequentially comparing the image data with one of the reference model of multiple resolutions stored in the reference model storage unit from the lowest resolution.

3. The apparatus according to claim 2, wherein the reference model is a background model which is configured by image data including only background of the image data read by the reading unit.

4. The apparatus according to claim 2 further comprising an updating unit configured to update the reference model stored in the reference model storage unit using image data of an area which is not determined as the object area by the object area detection unit.

5. The apparatus according to claim 1, wherein the image acquisition unit includes an image sensor for generating a pixel signal by photoelectric conversion.

6. A method for detecting an object, the method comprising:
    acquiring image data;
    reading image data of a first frame in sequential frames in a predetermined image area at predetermined resolution;
    detecting an object area from read first image data;
    discriminating a predetermined object from the detected object area;

determining an image area to read image data of a second frame succeeding to the first frame in the sequential frames based on the detected object area in the first frame;

determining a resolution used to read the image data from the image area of the second frame based on a first number of pixels in the object area of the first frame and a second number of pixels which can be read within a predetermined time period by the reading unit; and reading the second image data from the determined image area at the determined resolution.

7. A non-transitory computer-readable storage medium storing a program for causing a computer to execute the method according to claim 6.

* * * * *